(12) United States Patent
Forssell

(10) Patent No.: US 8,270,980 B2
(45) Date of Patent: Sep. 18, 2012

(54) CONTROLLING HANDOVER

(75) Inventor: Mika Forssell, Söderkulla (FI)

(73) Assignee: Nokia Siemens Networks Oy, Espoo (FI)

( * ) Notice: Subject to any disclaimer, the term of this patent is extended or adjusted under 35 U.S.C. 154(b) by 301 days.

(21) Appl. No.: 12/665,098

(22) PCT Filed: Jun. 19, 2008

(86) PCT No.: PCT/EP2008/057743
§ 371 (c)(1),
(2), (4) Date: Dec. 17, 2009

(87) PCT Pub. No.: WO2008/155371
PCT Pub. Date: Dec. 24, 2008

(65) Prior Publication Data
US 2010/0159934 A1    Jun. 24, 2010

(30) Foreign Application Priority Data
Jun. 20, 2007    (FI) ..................... 20075471

(51) Int. Cl.
*H04W 36/00* (2009.01)

(52) U.S. Cl. ........ 455/439; 455/436; 455/437; 455/438; 455/442; 455/453; 370/331

(58) Field of Classification Search ............... 455/436, 455/437, 438, 439, 442, 452.2, 453; 370/331
See application file for complete search history.

(56) References Cited

U.S. PATENT DOCUMENTS
2005/0243870 A1    11/2005    Balogh et al. ............... 370/522
2008/0039089 A1*    2/2008    Berkman et al. ............. 455/436

FOREIGN PATENT DOCUMENTS
| | | |
|---|---|---|
| EP | 1 213 941 A2 | 6/2002 |
| EP | 1 432 198 A1 | 6/2004 |
| WO | WO 2006/130063 A1 | 12/2006 |
| WO | WO 2007/043927 A1 | 4/2007 |

* cited by examiner

Primary Examiner — Kathy Wang-Hurst
(74) Attorney, Agent, or Firm — Harrington & Smith

(57) ABSTRACT

A method for controlling a handover and an apparatus are provided. The apparatus includes an interface to communicate with mobile units and a processing unit to determine a need for a mobile unit having more than one ongoing service connection to execute a handover and to send a handover command to the mobile unit through the interface, the handover command instructing the mobile unit to handover part of the ongoing service connections to a new network.

23 Claims, 5 Drawing Sheets

CONTROLLING HANDOVER

FIELD

The invention relates to controlling a handover in radio communication.

BACKGROUND

Communication systems, and wireless communication systems in particular, have been under extensive development in recent years. In addition to the conventional speech transmission, several new services have been developed. Different data and multimedia services are attractive to users, and communication systems should provide sufficient quality of service.

In addition to new services, the number of different technologies in the area of wireless communication has increased. In addition to cellular communication systems, such as GSM (Global System for Mobile Communication) and UMTS (Universal Mobile Telephone System), local area networks such as WLAN (Wireless Local Area Network) and WiMAX (Worldwide Interoperability for Microwave Access) have been developed, for example.

To provide users with good and versatile service, manufactures have introduced communication devices which support several different networks and radio access systems. The devices may be configured to maintain several service connections simultaneously. For example, a speech call may be ongoing while the device is connected to the Internet using an Internet Protocol based connection.

As users of mobile communication units move, the mobile units with ongoing service connections may be transferred in a handover procedure from one base station or network element to another one which offers better signal quality, capacity or other capabilities to support service connections. With the introduction of networks with a variety of different capabilities and capacities the present methods of performing handover may lead to problems in the quality of service experienced by the users.

BRIEF DESCRIPTION

An object of the invention is to provide an improved method of controlling a handover. According to an aspect of the invention, there is provided an apparatus, comprising: an interface to communicate with mobile units; a processing unit to determine a need for a mobile unit having more than one ongoing service connections to execute a handover and to send a handover command to the mobile unit through the interface, the handover command instructing the mobile unit to handover part of the ongoing service connections to a new network.

According to another aspect of the invention, there is provided an apparatus, comprising: an interface to communicate with mobile units; a processing unit to receive through the interface a message from a mobile unit having more than one ongoing simultaneous service connections, the message indicating a need to perform a handover, determine the parts of the service connections to be included in the handover and to send a command to the mobile unit through the interface, the command instructing the mobile unit to handover part of the ongoing service connections to a new network.

According to another aspect of the invention, there is provided an apparatus, comprising: an interface to communicate with more than one network and on more than one ongoing service connections simultaneously; a processing unit to receive through the interface a handover command instructing the apparatus to handover part of the ongoing service connections to a new network and to perform the desired handover.

According to another aspect of the invention, there is provided an apparatus, comprising: an interface to communicate with more than one network and on more than one ongoing service connections simultaneously; a processing unit to determine a need to execute a handover; send through the interface information about the need to perform a handover to a network the apparatus is connected to; receive through the interface information which part of the ongoing service connections are to be included in the handover.

According to another aspect of the invention, there is provided a method, comprising: determining a need for a mobile unit having more than one ongoing service connections to execute a handover; sending to the mobile unit a handover command instructing the mobile unit to handover part of the ongoing service connections to a new network.

According to another aspect of the invention, there is provided a method, comprising: communicating on more than one ongoing service connections simultaneously; receiving a handover command comprising instructions to handover part of the ongoing service connections to another network; and executing the desired handover.

According to another aspect of the invention, there is provided a telecommunication system, comprising: a network unit comprising an interface to communicate with mobile units and a processing unit to determine a need for a mobile unit having more than one ongoing service connections to execute a handover and to send a handover command to the mobile unit through the interface, the handover command instructing the mobile unit to handover part of the ongoing service connections to a new network; and a mobile unit, comprising an interface to communicate with more than one network and on more than one ongoing service connections simultaneously, and a processing unit to receive through the interface a handover command instructing the apparatus to handover part of the ongoing service connections to a new network and to perform the desired handover.

Embodiments of the invention are disclosed in the dependent claims. In an embodiment of the invention, the parts of the service connections requiring handover are determined on the basis of the load of different networks. In an embodiment, the radio capabilities of the mobile unit may be taken into account when determining the parts of the service connections requiring handover. In addition, the network may send a handover command instructing the mobile unit to handover Internet Protocol based connections to a new network and retain other connections on the currently used network. In addition, the network may send a handover command instructing the mobile unit to handover (broadband) data connections to a new network and retain voice connections on the currently used network.

In an embodiment, the network may send a mobile unit information on the quality of the service offered by the available networks, and the mobile unit may be configured to select, on the basis of the received information, the services that are included in the handover to another network.

LIST OF DRAWINGS

Embodiments of the present invention are described below, by way of example only, with reference to the accompanying drawings, in which FIG. 1 illustrates an environment where embodiments of the invention may be applied;

FIGS. 2A and 2B illustrate examples of a network unit;
FIG. 3 illustrates an example of a mobile unit;
FIGS. 4A and 4B illustrate embodiments of the invention;
FIG. 5 is a signaling chart illustrating an embodiment;
FIG. 6 is a flowchart illustrating an embodiment; and
FIGS. 7A, 7B and 7C are flowcharts illustrating embodiments.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

An example of the general architecture of an environment where embodiments of the invention may be applied is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems of FIG. 1 also comprise other functions and structures.

FIG. 1 shows a mobile unit 100 capable of communicating with three networks 100, 102, 104. The networks may utilise different radio access methods. Examples of networks include GSM (including GPRS (General Packet Radio Service) and EDGE (Enhanced Data rates for Global Evolution)), UMTS (including WCDMA (Wideband Code Division Multiple Access) and HSPA (High-Speed Packet Access)), LTE (Long Term Evolution), WLAN, Bluetooth, and WiMAX.

The network units 102, 104, 106 may be base stations or other network elements, such as modems or routers. The units 102, 104, 106 may be connected to the Internet 108 and/or a public telephone network 110 and provide service connections with which the user of the mobile unit may access different services, such as speech calls, text messages, multimedia messages and various Internet Protocol based services. These services may have different data transmission and quality of service (QoS) needs.

Different networks may have different capabilities to support various services. For example, GSM and UMTS provide excellent support for speech calls, text messages and multimedia messaging. Data services are also supported adequately. However, the capacity to support broadband data traffic may be limited. WLAN is optimised for broadband data traffic but the support of speech calls is limited.

In the past, communication networks did not widely support handovers from one system to another. However, as wireless communication has gained popularity and new access methods and networks have been developed, handover issues have been taken into account to improve the usability of the networks and the quality of the service experienced by the users.

FIG. 2A illustrates an example of a network unit 102, 104, or 106. Although the unit has been depicted as one entity, different modules and memory may be implemented in one or more physical or logical entities.

The network unit comprises an interface 200 configured to communicate with mobile units. The interface may comprise an antenna 202 and one or more transceivers 204, 206, depending on the radio access technology utilised. The unit comprises a processing unit 208 and a memory 210. The processing unit may be operationally connected to the interface 200 and memory 210. The processing unit is configured to control the operation of the unit. The memory 210 is configured to store data and software required by the processing unit. The unit may further comprise a second interface 214 configured to connect the unit to other network units of the system the network unit belongs to, the Internet and other networks, for example.

The network unit may be the unit in a network responsible for performing and controlling handovers. The unit is not necessarily the base station or router being in a direct radio connection with a mobile unit but rather a unit operationally connected to such a base station or a router.

Figure 1:
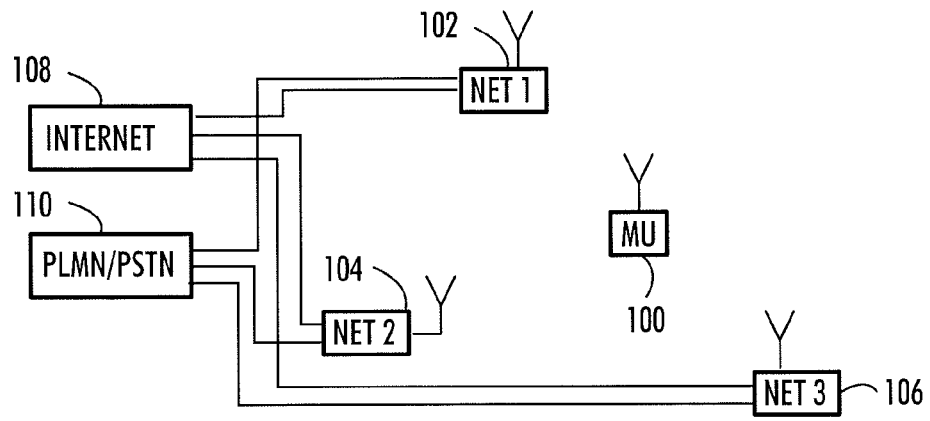

The mobile unit comprises an interface 300 configured to communicate with one or more networks and possibly other mobile units. The interface may comprise one or more radio transceiver units 302, 304 and one or more antennas 306. The different radio transceiver units may be configured to support one or more different networks or radio access systems. Thus, the mobile unit may communicate with different networks and possibly with other mobile units. Examples of possible networks include GSM/GPRS/EDGE, UMTS, WLAN, Bluetooth, and WIMAX.

The unit further comprises a processing unit 308 and a memory 310. The processing unit may be operationally connected to the interface 300 and memory 310. The processing unit is configured to control the operation of the mobile unit. The memory 310 is configured to store data and software required by the processing unit. The mobile unit may further comprise a user interface unit 314 with which the user may control the operation of the unit. Typically, the user interface unit 314 comprises a microphone, a speaker, a keyboard and a display, for example. The user interface may be realised with many different technologies, as one skilled in the art is aware. For example, the user interface may comprise a touch sensitive screen or a voice activation system.

The mobile unit may communicate on more than one service connections simultaneously. For example, a speech call may be ongoing while the device is connected to the Internet using an Internet Protocol based connection. In addition, a text message or a multimedia message may be sent and/or received during both of the above connections.

The mobile unit 100 refers to a portable computing device. Such computing devices include wireless mobile communication devices operating with or without a subscriber identification module (SIM), including, but not limited to, the following types of devices: a mobile phone, a smartphone, a multimedia computer, a personal digital assistant (PDA), a universal mobile personal computer, a handset. A wireless connection supported by the mobile unit may be implemented with a wireless transceiver operating according to the GSM, WCDMA, WiMAX, WLAN or Bluetooth® standard, or any other suitable standard/non-standard wireless communication means.

Figure 4A:
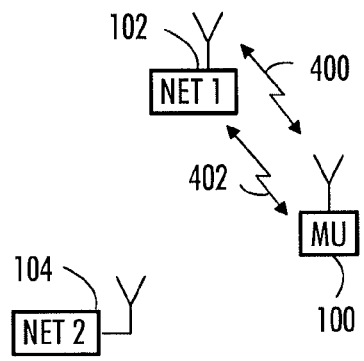

FIG. 4A illustrates an example where the mobile unit 100 has an ongoing speech call connection to a network unit 102. Let us assume that the network unit 102 is a UMTS base station. In addition, the mobile unit has an ongoing data connection 402 to the network unit 102 using an Internet Protocol (IP). The data connection may need a relatively large bandwidth. If the network unit 102 cannot provide the mobile unit 100 with the bandwidth it requires, a handover is needed. In prior art solutions, if an available network capable of providing the required bandwidth were found, the mobile unit would perform a handover to the network and all ongoing connections of the mobile unit would be re-established in the new network.

In an embodiment of the invention, the network unit 102 sends a handover command to the mobile unit 100, the handover command instructing the mobile unit 100 to handover part of the ongoing service connections to a new network. Thus, part of the ongoing connections may be retained on the currently used network. In an embodiment, the network unit 102 determines the parts of the service connections requiring handover on the basis of the load of different networks. The network unit 102 may communicate between different available networks and query the load situation of each suitable network. In addition, the radio capabilities of the mobile unit and/or ongoing service connection requirements/characteristics may be taken into account when determining the connections to handover.

In an embodiment, the network unit 102 determines the parts of the service connections requiring handover on the basis of the suitability of different networks. For example when a WLAN network becomes available (e.g. an office network), data connections may be moved to the WLAN network.

In an embodiment, the network unit 102 determines the parts of the service connections requiring handover on the basis of the radio quality of different networks. For example, a broadband data connection requires better signal quality to reach higher bit rates than a voice call.

For example, in the example of FIG. 4A, the network unit 102 may send a handover command to the mobile unit 100 instructing the mobile unit 100 to transfer the Internet Protocol based connection 402 to the network unit 104, which may be a WLAN network unit and have available capacity for a broadband Internet connection.

Figure 4B:
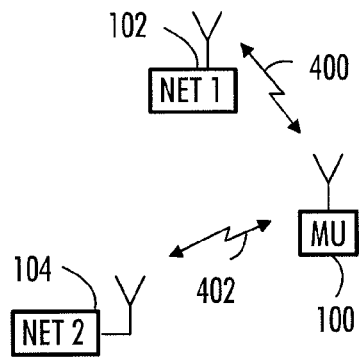
Figure 2A:
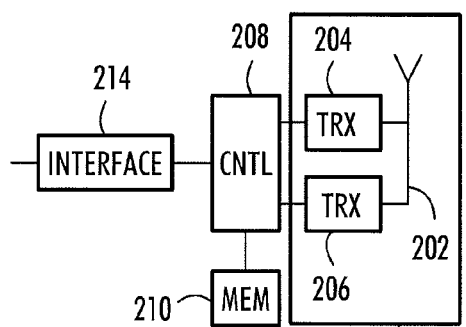
FIG. 2B illustrates an example of a network unit not directly connected to a mobile unit. In this example the interface unit 200 does not comprise radio transceivers, as in FIG. 2A, but an interface to connect the unit to other network units which, in turn, may be connected to a mobile unit.
Figure 2B:
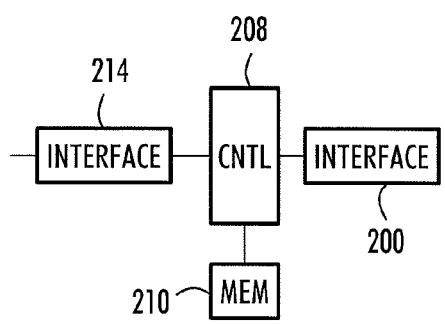
Figure 3:
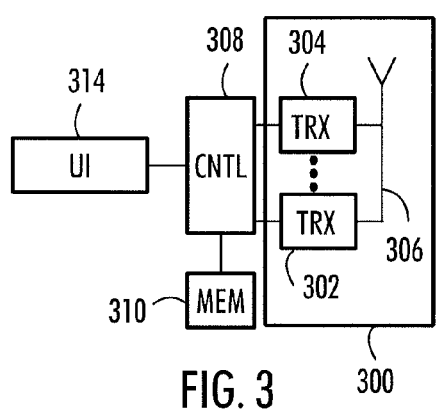
FIG. 3 illustrates an example of a mobile unit 100. Although the unit has been depicted as one entity, different modules and memory may be implemented in one or more physical or logical entities.

FIG. 4B illustrates the situation after performing the partial handover. The mobile unit has a speech connection 400 with the UMTS network unit 102 and an IP based data connection with the WLAN network unit 104.

In an embodiment of the invention, a partial service based network controlled handover is performed by moving only some of the ongoing wireless service connections to a new network and by leaving some of the service connections in the currently used network, or by moving them to yet new another network if the currently used network becomes unusable or unpreferred. Thus, the mobile unit runs some services via a first network and some services via a second network, where one or none of the networks may be the same network that was used before handover.

The proposed handover is advantageous in a heterogeneous access network environment for load balancing purposes, improved service quality and cost saving. In addition, traffic from a congested cell or hot spot may be moved to a non-congested cell or hot spot. Since broadband IP data will consume a considerable amount of available bandwidth, it is advantageous in some cases to move only IP data over to another access network and leave speech and other low bandwidth services on some other network. In this way the service quality experienced by an end user, especially in the case of speech, will remain high.

Cellular networks have sufficient capacity for speech connections but not always for broadband data (e.g. indoors). Thus, in some cases it may be beneficial to use cellular systems for speech calls and available WLAN for broadband IP data. In some cases it may be beneficial to retain speech services in a GSM based network and handover data services to a WiMAX or a WLAN network. In general, there are several available combinations, as one skilled in the art is aware. For example, low bit rate connections may be retained in a first UMTS network and high bit rate connections may be transferred to a neighboring UMTS network, where there may be more capacity for such connections.

In an embodiment, services requiring constant reachability utilize wide coverage networks, such as cellular or WiMAX, when possible, while other applications might be moved to WLAN network when available, for example.

In an embodiment, the handover command sent by the network to a mobile unit includes information that indicates to the mobile unit device which services are being handed over to a new network. On the basis of the information the mobile unit may use one network for some of the services and another network for some other services. More than two networks can be used simultaneously. However, the more radio units the mobile unit uses the higher is the battery consumption of the unit.

In an embodiment, all IP based data services are handed over to a new network and other services (such as speech, text messaging and multimedia messaging) will reside on currently used network.

In an embodiment, the services utilized by a mobile unit are identified with service specific descriptions known to both the mobile unit and network units. For example, different services may be given specific Service Identifications (Service ID). Thus, if a mobile unit is transferring a voice call, an email connection and video streaming over UMTS HSPA connection, the serving network could with a handover command comprising video streaming Service ID instruct the mobile unit to transfer video streaming to an available WLAN network and retain other connections on HSPA.

In an embodiment, voice related services are given one Service ID and data related services another Service ID. In an embodiment, services utilizing different IP transport protocol (like TCP and UDP) ports are given a different Service ID.

In an embodiment, the serving network is configured to send a handover command comprising information on the quality of the service offered by the available networks, and a command for the mobile unit to decide which services are included in the handover to another network. Besides indicating the quality of the service of the available networks or the quality of the service that the available networks may still support (after existing traffic), the quality of the service may be detailed enough to describe which applications shall be selected for handover. For example, traffic class streaming might move video streaming into a new network and keep other services, like voice call and email in the existing network. Likewise bit rate or delay information could describe which applications shall be selected for handover. On the basis of the received quality of the service information, the mobile unit may select the services that are included in the handover to another network.

Figure 5:
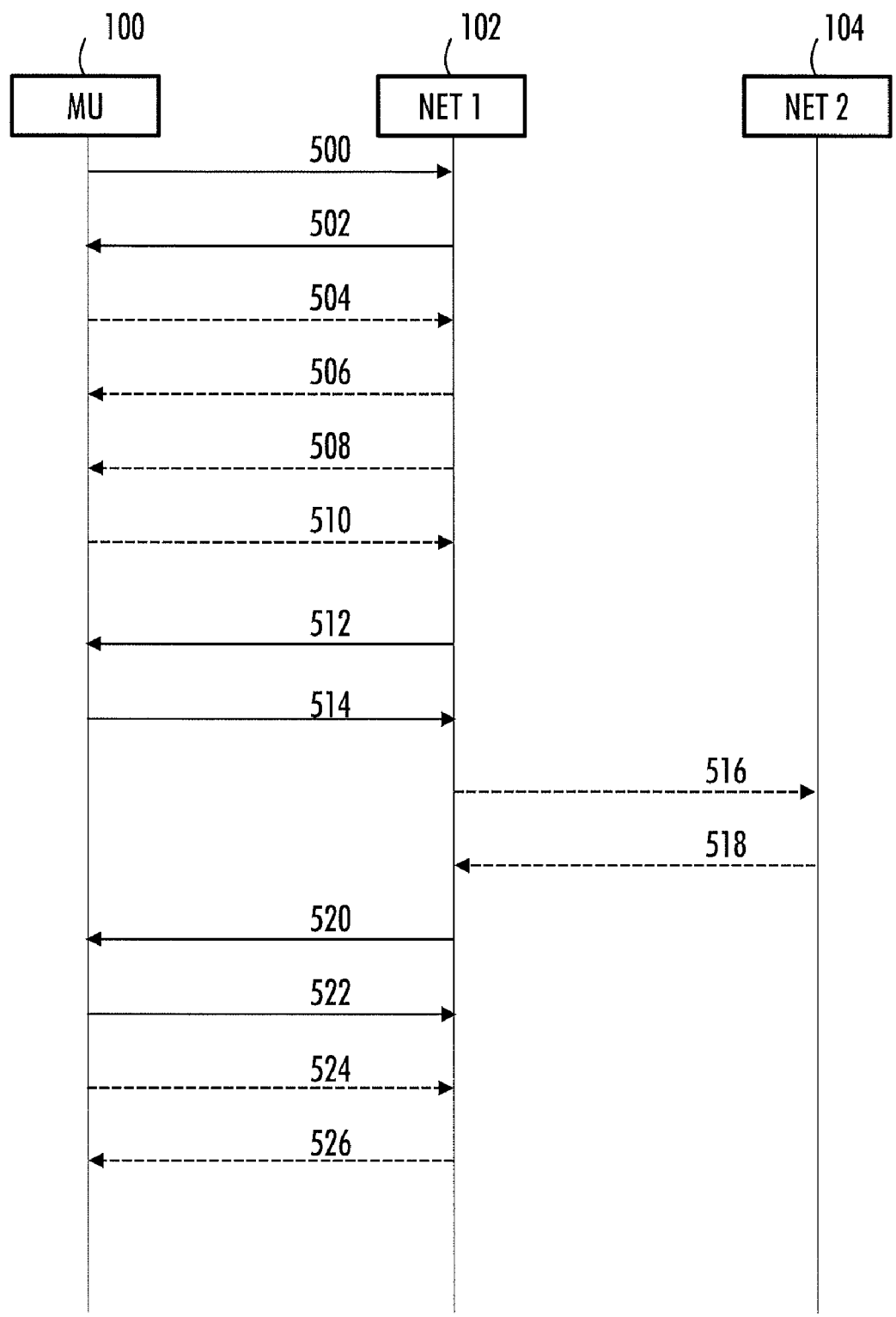

FIG. 5 is a signaling chart illustrating an embodiment. The chart describes an example of possible signaling between a mobile unit 100 and two network units 102,104 during a partial handover. Handover may be performed between different networks, between different radio access systems of the same network, or between different points of attachments in a network. The network units in question may be the units in the network responsible for performing and controlling handovers. The units are not necessarily the base stations or routers being in direct radio connection with the mobile unit but units operationally connected to the base station or router. The signalling of FIG. 5 is merely an example of a way to realise the handover signalling.

In a message (500), the mobile unit 100 requests the handover capabilities the network unit 102 supports and notifies the network of its handover capabilities. Handover capabilities related to handovers between different access systems and networks are included in the above request and notification.

In a message (502), the network unit 102 serving the mobile unit 100 notifies the mobile unit of its handover capabilities.

In a case where the network and the network unit 102 supports a network triggered handover, the mobile unit 100 sends a register request (504) to the network regarding respective handover services in order to allow the network to address the mobile unit.

In a message (506), the network unit 102 responds to the mobile unit with information if the registration was successful.

In a message (508), the network unit may request the mobile unit to scan for neighbour networks the mobile unit is detecting.

In a message (510), the mobile unit 100 reports to the network unit 102 a list of neighbouring networks and the signal strength of the detected networks.

In a message (512), the network unit 102 initiates a handover procedure and provides a list of candidate target access networks to the mobile unit in a preferred order. The handover message may include information of the next target network the mobile unit shall take into use or a list of candidate networks the mobile unit considers when selecting the next target network to be used. The message may comprise information about which services need to be included in the handover. The information may be included in the message as a separate information element. For example, the message could comprise the following 1 byte long data fields having values either 0 (not included in the handover) or 1 (included in the handover) to guide the mobile unit:

|Handover for speech service|
|Handover for IP broadband data|.

The latter could include voice over IP (VoIP) connections or could leave them out. The above information fields are merely an example. The fields could be divided according to defined Service IDs, according to the service connection bit rates, delay classes, traffic classes, the quality of the service in general or according to some other metric.

In a message (514), the mobile unit 100 responds to the network unit 102 with a list of candidate target access networks that may be different from the one provided by the network unit 102.

The message may further comprise information about the possible restrictions the mobile unit has regarding the simultaneous use of different radio units. Some mobile units may have only cellular and WLAN/WIMAX radio units active at the same time. The network unit may be informed about these restrictions as it may have an effect on the handover parameters. For example, if a mobile unit does not support simultaneous use of cellular and WLAN or WIMAX radio units and has a speech connection and a broadband connection open on a cellular network at the same time, the network cannot send the mobile unit a handover command where only broadband connection is transferred from cellular to WLAN or WiMAX. The above information may be included in other messages as well, such as in the message 522 or 500.

In (516), the network unit 102 serving the mobile unit 100 may request availability of required resources from the network unit 104 that is the target of the handover.

In (518), the candidate target network unit 104 responds to the network unit 102 serving the mobile unit 100, informing it whether the requested resources are available or not.

In (520), the network unit 102 may command link actions to the presently used link and thus use the message to request the mobile unit to stop using a specific link, for example.

In (522), the mobile unit 102 responds to the network unit 102 whether it is able to fulfil the command or not.

In (524), the mobile unit 102 notifies the network unit 102 whether handover was successful or not.

Figure 6:
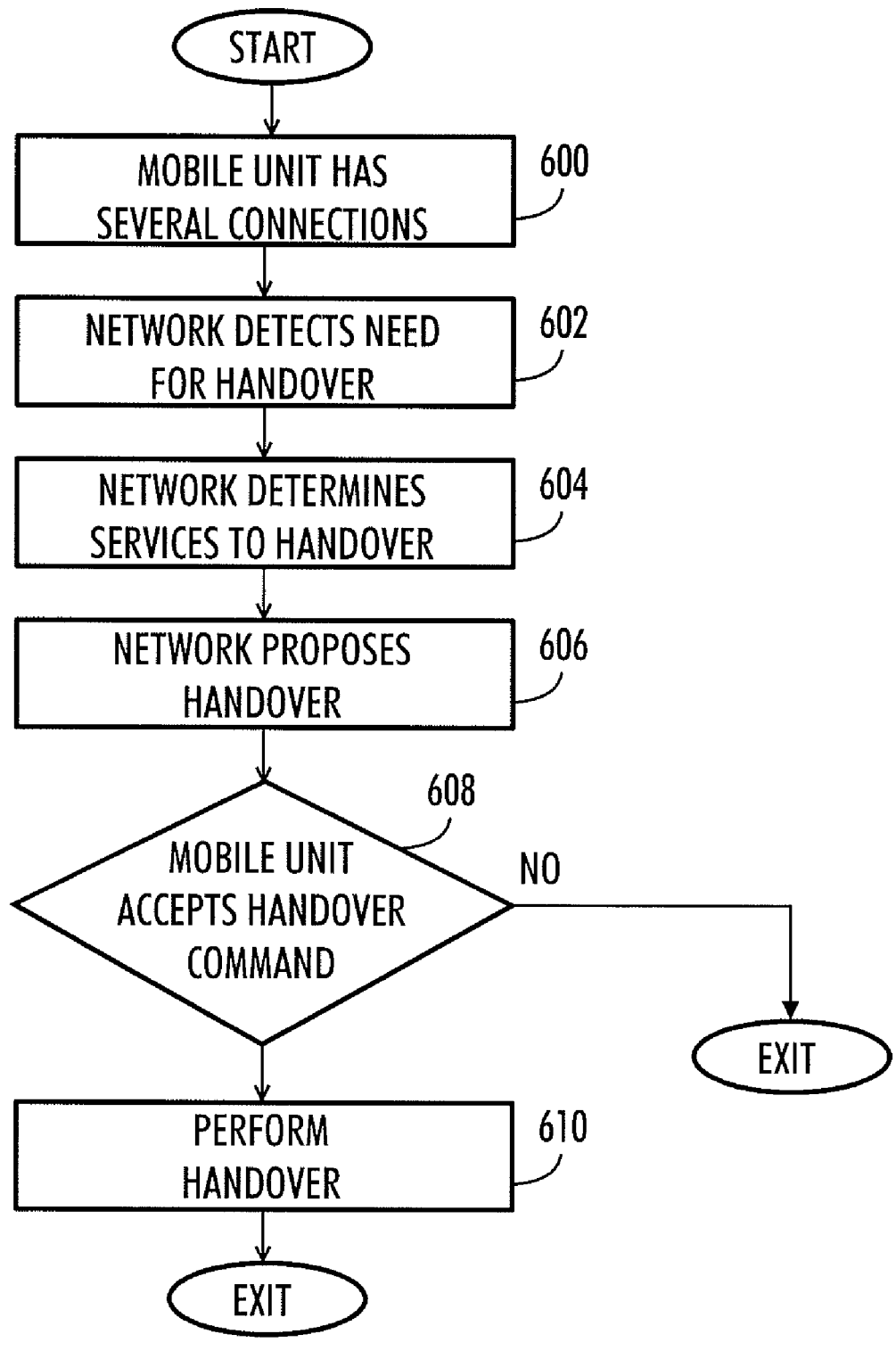

In (526), the network unit 102 responds to the mobile unit 102. FIG. 6A is a flowchart illustrating an embodiment.

The process starts in 600, where a mobile unit has more than one ongoing service connection with a network unit. For example, the mobile unit may have a speech connection and one or more data connections open, some of these being broadband connections.

In step 602, the network the mobile unit is connected to detects a need for a handover. The network monitors the load and/or radio quality of the network and the capacity required by the mobile unit. The network may also have available information about the load of nearby networks. The network may try to balance the load in a congested cell or hot spot by transferring some high bandwidth connections to nearby networks. The network may also try to improve radio quality and thus connection quality by transferring some connections to nearby networks.

In step 604, the network the mobile unit is connected to determines the service connections of the mobile unit which could be included in the handover. The radio capabilities of the mobile unit, the load information from used and nearby networks, the preference of the networks that defined applications shall use (e.g. defined by the end user, an operator or an enterprise), the radio quality of the affected networks and requirements of service connections may be taken into account in the selection of service connections.

In step 606, the network the mobile unit is connected to proposes the handover to the mobile unit by using the message 512 of FIG. 5, for example.

In step 608, the mobile unit either accepts or rejects the handover command. In a case where the handover command is accepted, the handover is executed in step 610. Otherwise the process ends.

In an embodiment, the message sent in step 606 comprises information on the quality of the service offered by the available networks, and a command for the mobile unit to decide which services are included in the handover to another network. In step 608 the mobile unit may make the required decisions.

In an embodiment, the message sent in step 606 comprises information on the quality of the service or similar identifying a service or a group of services (such as traffic class streaming or conversation), and a command for the mobile unit to decide which services are included in the handover to another network. In step 608 the mobile unit may make the required decisions.

Figure 7A:
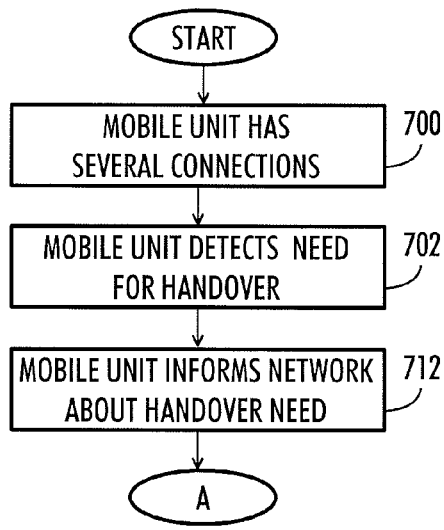
Figure 7B:
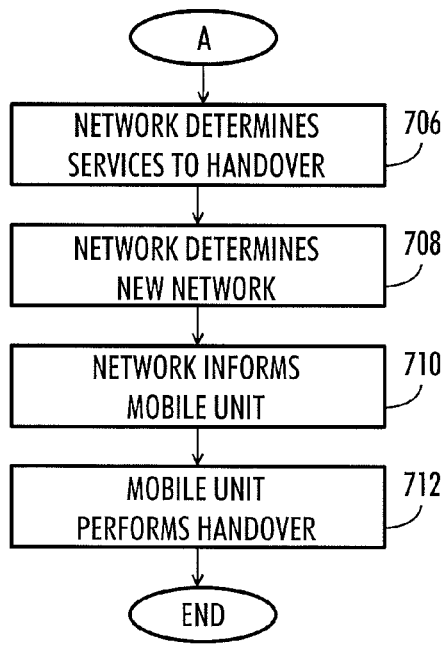
Figure 7C:
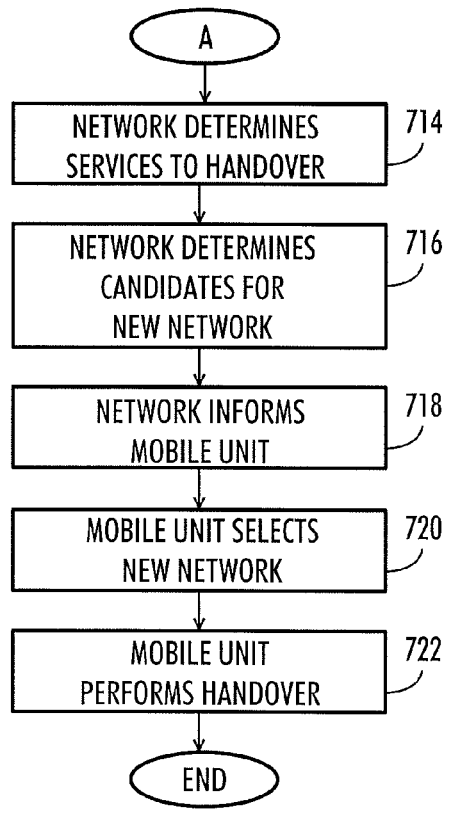

FIGS. 7A, 7B and 7C show flowcharts illustrating embodiments.

In FIG. 7A, the process starts in 700, where a mobile unit has more than one ongoing service connection with a network unit. For example, the mobile unit may have a speech connection and one or more data connections open, some of these being broadband connections.

In step 702, the mobile unit detects a need for a handover.

In step 704, the mobile unit informs the network it is connected to about the need for handover.

FIG. 7B is a flow chart illustrating an embodiment continuing from the flowchart of FIG. 7A. In step 706, the network determines the service connections of the mobile unit which could be included in the handover or characteristics of connections that mobile chooses for handover.

In step 708, the network determines the target network of the handover.

In step 710, the network sends the mobile unit information regarding the services included in the handover and the target network.

In step 712, the mobile unit performs the handover.

FIG. 7C is a flow chart illustrating an embodiment continuing from the flowchart of FIG. 7A. In step 714, the network determines the service connections of the mobile unit which could be included in the handover.

In step 716, the network determines candidates for the target network of the handover.

In step 718, the network sends the mobile unit information regarding the services included in the handover and the candidate target networks.

In step 720, the mobile unit determines the target network of the handover.

In step 722, the mobile unit performs the handover.

In an embodiment, an access network such as an HSPA based network is used merely as a bit pipe. In such environments, a mobile unit and a network unit behind the access network communicate and perform handovers using IP based connection, for example. In such an environment, a network handover unit is not operationally connected to the base station. For example, if a mobile unit reports available networks and the network handover unit makes a network selection based on priorities and/or received signal strength and/or knowledge of theoretical capabilities of different networks.

The processing unit of a network unit and a mobile unit may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, execute the handover controlling method in a network unit or a mobile unit described earlier.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The processing units of a network unit and a mobile unit may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the network unit and the mobile unit, necessary processing capacity, production costs, and production volumes, for example.

The steps, signaling messages and related functions described above in FIGS. 5, 6A, 6B, and 7A to 7C are in no absolute chronological order, and some of the steps may be performed simultaneously or in an order differing from the given one. Other functions can also be executed between the steps or within the steps and other signaling messages sent between the illustrated messages. Some of the steps or part of the steps can also be left out or replaced by a corresponding step/point or part of the step. The signaling messages are only exemplary and may even comprise several separate messages for transmitting the same information. In addition, the messages may also contain other information.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus, comprising:
an interface to communicate with mobile units;
a processing unit to determine a need for a mobile unit having more than one simultaneously ongoing service connections on at least one first access network to execute a handover and to send a handover command to the mobile unit through the interface, the handover command instructing the mobile unit to handover part of the simultaneously ongoing service connections to a new, second access network, where said processing unit is further configured to select as the new second access network an access network offering higher bandwidth than the first access network for an Internet Protocol based connection, and to select as the new second access an access network offering lower bandwidth than the first access network for a speech connection, and where the handover command instructs the mobile unit to handover just the Internet Protocol based connection or just the speech connection to the selected new second access network and to retain the other simultaneously ongoing service connection on the first access network.

2. The apparatus of claim 1, comprising a processing unit configured to determine the parts of the service connections requiring handover on the basis of the load of different networks.

3. The apparatus of claim 1, comprising a processing unit configured to determine the parts of the service connections requiring handover on the basis of the radio capabilities of the mobile unit.

4. The apparatus of claim 1, comprising a processing unit configured to determine the parts of the service connections requiring handover on the basis of the radio quality of different networks.

5. The apparatus of claim 1, comprising a processing unit configured to send a handover command comprising information on the quality of the service offered by available access networks, and a command for the mobile unit to decide which of the simultaneously ongoing services are to be included in the handover to another access network.

6. The apparatus of claim 1, comprising an interface to communicate with other networks.

7. An apparatus, comprising:
an interface to communicate with mobile units;
a processing unit to receive through the interface a message from a mobile unit having more than one ongoing simultaneous service connection on at least one first access network, the message indicating a need to perform a handover,
determine parts of the service connections to be included in the handover and to send a command to the mobile unit through the interface, the command instructing the mobile unit to handover part of the ongoing simultaneous service connections to a new, second access network, where said processing unit is further configured to select as the new second access network an access network offering higher bandwidth than the first access network for an Internet Protocol based connection, and to select as the new second access an access network offering lower bandwidth than the first access network for a speech connection, and where the command instructs the mobile unit to handover just the Internet Protocol based connection or just the speech connection to the selected new second access network and to retain the other simultaneously ongoing service connection on the first access network.

8. The apparatus of claim 7, comprising a processing unit configured to send a message to the mobile unit comprising information about available access networks.

9. An apparatus, comprising:
an interface to communicate with more than one network and on more than one ongoing service connection simultaneously;
a processing unit to receive through the interface a handover command instructing the apparatus to handover part of the ongoing service connections from a first access network to a new, second access network and to perform the desired handover, where the new second access network is an access network offering higher bandwidth than the first access network for an Internet Protocol based connection, where the new second access is an access network offering lower bandwidth than the first access network for a speech connection, and where in response to the handover command the apparatus is configured to handover just the Internet Protocol based connection or just the speech connection to the selected new second access network and to retain the other simultaneously ongoing service connection on the first access network.

10. The apparatus of claim 9, further comprising:
a processing unit to receive through the interface information on a quality of the service offered by available access networks, and to select, on the basis of the received information, the services that are included in the handover to the new second access network.

11. The apparatus of claim 9, further comprising:
a processing unit to send through the interface to the network the apparatus is connected to information about the capability of the apparatus to maintain simultaneous connections with different networks.

12. An apparatus, comprising:
an interface to communicate with more than one network and on more than one ongoing service connection simultaneously;
a processing unit to determine a need to execute a handover;
send through the interface information about the need to perform a handover to the network the apparatus is connected to;
receive through the interface information on which part of the ongoing service connections currently conveyed through a first access network is to be included in the handover to a new, second access network, where the new second access network is an access network offering higher bandwidth than the first access network for an Internet Protocol based connection, where the new second access is an access network offering lower bandwidth than the first access network for a speech connection, and where the information is received as part of a handover command and in response to the handover command the apparatus is configured to handover just the Internet Protocol based connection or just the speech connection to the selected new second access network and to retain the other simultaneously ongoing service connection on the first access network.

13. The apparatus of claim 12, further comprising:
a processing unit to receive through the interface a command indicating the new, second access network where the handover is to be performed.

14. The apparatus of claim 12, further comprising:
a processing unit to receive through the interface information indicating available access networks, and to select, on the basis of the received information, the new second access network where the handover is to be performed.

15. A method, comprising:
determining a need for a mobile unit having more than one simultaneously ongoing service connection on at least one first access network to execute a handover;
sending to the mobile unit a handover command instructing the mobile unit to handover part of the simultaneously ongoing service connections to a new, second access network, further comprising
selecting as the new second access network an access network offering higher bandwidth than the first access network for an Internet Protocol based connection,
selecting as the new second access an access network offering lower bandwidth than the first access network for a speech connection, and
where the handover command instructs the mobile unit to handover just the Internet Protocol based connection or the speech connection to the selected new second access network and to retain the other simultaneously ongoing service connection on the first access network.

16. The method of claim 15, further comprising:
determining the parts of the service connections requiring handover on the basis of the load of different access networks.

17. The method of claim 15, further comprising:
determining the parts of the service connections requiring handover on the basis of the radio capabilities of the mobile unit.

18. The method of claim 15, further comprising:
sending a handover command comprising information on the quality of the service offered by available access networks, and a command for the mobile unit to decide which of the simultaneously ongoing services are to be included in the handover to another access network.

19. A method, comprising:
communicating on more than one ongoing service connection simultaneously;

receiving a handover command comprising instructions to handover part of the ongoing service connections from a first access network to a new, second access network; and executing the desired handover, where the new second access network is an access network offering higher bandwidth than the first access network for an Internet Protocol based connection, where the new second access is an access network offering lower bandwidth than the first access network for a speech connection, and where in response to the handover command, executing the desired handover comprises handing over just the Internet Protocol based connection or just the speech connection to the selected new second access network and retaining the other simultaneously ongoing service connection on the first access network.

20. The method of claim 19, further comprising:

receiving information on a quality of the service offered by available access networks; and selecting, on the basis of the received information, the services that are included in the handover to the new second access network.

21. A telecommunication system, comprising:

a network unit comprising an interface to communicate with mobile units, and a processing unit to determine a need for a mobile unit having more than one simultaneously ongoing service connection on at least one first access network to execute a handover and to send a handover command to the mobile unit through the interface, the handover command instructing the mobile unit to handover part of the ongoing service connections from the at least one first access network to a new, second access network; and a mobile unit, comprising an interface to communicate with more than one access network and on more than one ongoing service connection simultaneously, and a processing unit to receive through the interface a handover command instructing the mobile unit to handover part of the ongoing service connections to the new second access network and to perform the desired handover, where the new second access network is an access network offering higher bandwidth than the first access network for an Internet Protocol based connection, where the new second access is an access network offering lower bandwidth than the first access network for a speech connection, and where in response to the handover command the mobile unit is configured to handover just the Internet Protocol based connection or just the speech connection to the new second access network and to retain the other simultaneously ongoing service connection on the first access network.

22. A non-transitory computer-readable medium readable by a computer and comprising program instructions which, when loaded into an apparatus, execute the method according to claim 15.

23. A non-transitory computer-readable medium readable by a computer and comprising program instructions which, when loaded into an apparatus, execute the method according to claim 19.

* * * * *